United States Patent Office 2,819,263
Patented Jan. 7, 1958

2,819,263

PROCESS FOR PRODUCTION OF CAPROLACTAM

Herbert L. Wehrmeister, Terre Haute, Ind., assignor to Commercial Solvents Corporation, Terre Haute, Ind., a corporation of Maryland No Drawing. Application December 7, 1956
Serial No. 626,841

8 Claims. (Cl. 260—239.3)

My invention relates to caprolactam and more particularly it relates to a new process for the production of ε-caprolactam.

Caprolactam (2-ketohexamethylenimine) is useful as an intermediate in the production of polyamides, particularly nylon-type polymers. U. S. Patent 2,241,321 describes the use of caprolactam in making nylon-type threads. U. S. Patent 2,241,322 and U. S. Patent 2,251,519 describe the production of polyamides from caprolactam. See also U. S. Patents 2,281,961, 2,302,- 819, 2,367,469 and 2,524,228. Caprolactam has previously been prepared from cyclohexanone oxime by the so-called Beckmann rearrangement.

I have now discovered a new process for the production of ε-caprolactam. Thus my invention is the foundation of a valuable new means for obtaining the important synthetic fiber material nylon.

My new process consists essentially of dissolving 1-nitrocyclohexanemethanol in sulfuric acid and permitting the temperature to rise until ε-caprolactam is produced. The 1-nitrocyclohexanemethanol is dissolved in sulfuric acid ranging in concentration from about 60 to 100% although I prefer to employ sulfuric acid having a concentration of 75 to 95%. The reaction takes place at room temperature and at temperatures up to about 150° C. but at the temperatures in the upper part of this range, a considerable amount of tar forms thus reducing the yield of caprolactam. I prefer to dissolve the 1-nitrocyclohexanemethanol in sulfuric acid at room temperature and permit the temperature to rise as the reaction proceeds. When the temperature reaches about 50 or 60° C., I then heat the mixture to maintain a temperature ranging from about 90 to about 110° C. until the completion of the reaction. In carrying out my process, I add the 1-nitrocyclohexanemethanol to sulfuric acid and for any given quantity of sulfuric acid, I continue to add 1-nitrocyclohexanemethanol until the solution becomes so dilute by reason of the water formed in the reaction that no further conversion of 1-nitrocyclohexanemethanol to caprolactam takes place. I prefer to carry out my reaction by adding 1 gram mole of 1-nitrocyclohexanemethanol to about 325 ml. of sulfuric acid having a concentration of about 85%, permitting the temperature to rise during the addition of the 1-nitrocyclohexanemethanol and then heating the mixture to maintain the temperature at about 95° C. The end of the reaction is indicated by the cessation of evolution of carbon monoxide gas from the reaction mixture.

The compound 1-nitrocyclohexanemethanol which I employ in carrying out my process can be obtained by reacting nitrocyclohexane with formaldehyde in the presence of a basic catalyst such as sodium hydroxide. The reaction is ordinarily conducted at room temperature and at atmospheric pressure. Generally I am able to obtain 1-nitrocyclohexanemethanol in high yields and in substantially pure form. 1-nitrocyclohexanemethanol has a refractive index $n_D^{25}$ 1.4843, and a density, $d_{25}^{25}$ 1.1637.

The following example is offered to illustrate the production of 1-nitrocyclohexanemethanol.

*Example I*

To 20 ml. of 10% sodium hydroxide and 645 grams of nitrocyclohexane was added 425 ml. of aqueous 37% formaldehyde over a period of ten minutes. During the addition of the formaldehyde the temperature rose from about 26 to about 29° C. and following the addition of the formaldehyde, the solution was cooled and stirred at room temperature for 45 minutes. The mixture was then acidified with 20 ml. of 10% sulfuric acid from a pH of approximately 8 to a pH of approximately 5. The mixture was then steam distilled for one hour and 560 ml. of distillate removed. The residue settled into two layers which were separated and the aqueous layer extracted twice with 250 ml. of benzene, the benzene extract being added to the organic layer. The organic layer was then washed twice with 500 ml. of water and with 500 ml. of a solution containing 50 grams of sodium bisulfite. The organic layer was then washed again twice with 500 ml. of water and distilled at 97° C. at atmospheric pressure to remove the benzene and water leaving a residue of 963 grams of 1-nitrocyclohexanemethanol. Analysis: Calculated, N=8.83%; found, N=8.78%.

The following example is offered to illustrate my new process for the production of ε-caprolactam.

*Example II*

To 80 ml. of 85% sulfuric acid cooled to 19° C., 0.25 mole of 1-nitrocyclohexanemethanol was added dropwise and the temperature permitted to rise until it reached a maximum of about 50° C. after which the mixture was heated slowly to raise the temperature to about 97° C. The heating was intermittent with cooling between the heating periods, the total heating time being 15.5 hours. Heating was discontinued when the production of gas became negligible after which the reaction mixture was cooled to 0° C., neutralized with concentrated ammonium hydroxide and filtered. The filter cake and filtrate were extracted six times with 100 ml. of chloroform each time after which the solvent was flashed off and the residue distilled to yield crude caprolactam crystals. The crude material was recrystallized from hot ethyl ether to yield substantially pure ε-caprolactam. Analysis: Calculated N=12.39%; found N=12.02%.

As indicated by the above example, the caprolactam produced according to my new process can be recovered from the reaction mixture by neutralizing the reaction mixture with a base and then extracting the caprolactam from the reaction mixture with chloroform or other suitable solvent. In neutralizing the reaction mixture, I prefer to employ a base such that the salt formed is insoluble in the solvent subsequently employed to extract the caprolactam from the reaction mixture. Following removal of the extracting solvent, the crude crystalline caprolactam can be recrystallized from any convenient solvent such as, for example, ether.

Now having described my invention, what I claim is:

1. A process for the production of ε-caprolactam which comprises treating 1-nitrocyclohexanementhanol with sulfuric acid.

2. A process for the production of ε-caprolactam which comprises treating 1-nitrocyclohexanementhanol with sulfuric acid at a temperature ranging from about 25° C. to about 150° C.

3. A process for the production of ε-caprolactam which comprises treating 1-nitrocyclohexanementhanol with sulfuric acid at a temperature ranging from about 90 to 110° C.

4. A process for the production of ε-caprolactam which comprises treating 1-nitrocyclohexanementhanol with aqueous sulfuric acid having a concentration of at least about 60%.

5. A process for the production of ε-caprolactam which comprises treating 1-nitrocyclohexanementhanol with aqueous sulfuric acid having a concentration ranging from about 75 to 95%.

6. A process for the production of ε-caprolactam which comprises treating 1-nitrocyclohexanementhanol with aqueous sulfuric acid having a concentration ranging from about 75 to 95% at a temperature ranging from about 90 to 110° C.

7. A process for the production of ε-caprolactam which comprises treating 1-nitrocyclohexanementhanol with sulfuric acid and recovering the ε-caprolactam produced.

8. A process for the production of ε-caprolactam which comprises treating 1-nitrocyclohexanementhanol with sulfuric acid, neutralizing the reaction mixture, extracting the crude caprolactam from the reaction mixture with chloroform and distilling the chloroform solution to obtain crystalline ε-caprolactam.

No references cited.